No. 623,067. Patented Apr. 11, 1899.
V. E. BERNSON.
CURLING IRON HEATER.
(Application filed Apr. 23, 1897.)
(No Model.)
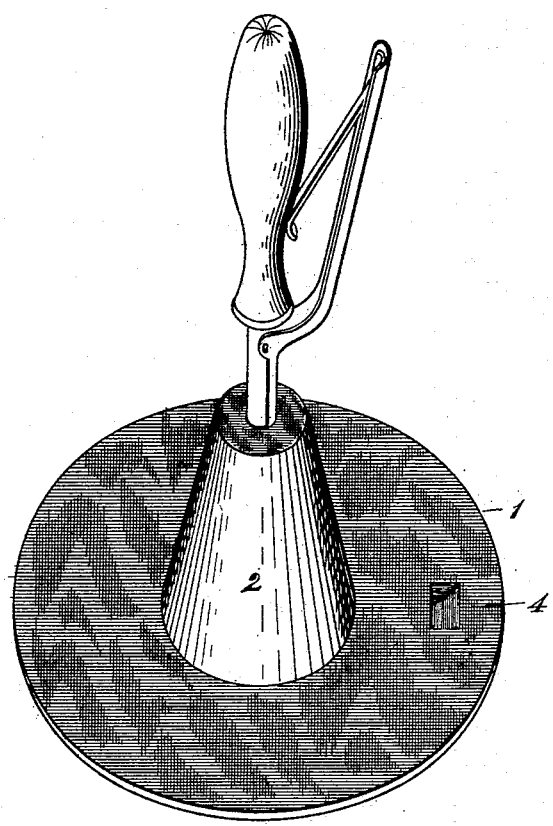
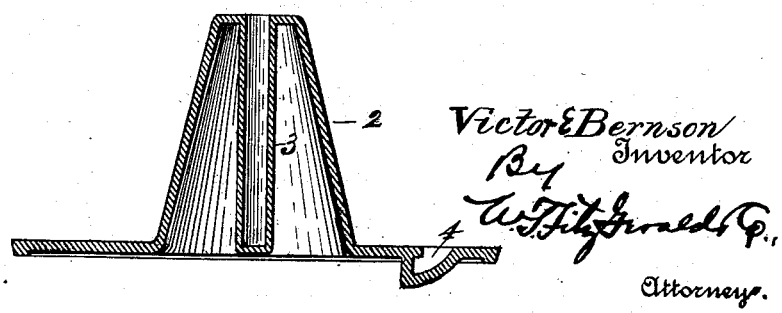
Witnesses
E. E. Overholt
M. E. Wakefield
Victor E Bernson
Inventor
By
W. T. Fitzgerald &c.,
Attorneys.
THE NORRIS PETERS CO., PHOTO-LITHO., WASHINGTON, D. C.

UNITED STATES PATENT OFFICE.

VICTOR E. BERNSON, OF SALEM, MASSACHUSETTS.

CURLING-IRON HEATER.

SPECIFICATION forming part of Letters Patent No. 623,067, dated April 11, 1899.

Application filed April 23, 1897. Serial No. 633,552. (No model.)

*To all whom it may concern:*

Be it known that I, VICTOR E. BERNSON, a citizen of the United States, residing at Salem, in the county of Essex and State of Massachusetts, have invented certain new and useful Improvements in Curling-Iron Heaters; and I do hereby declare the following to be a full, clear, and exact description of the invention, such as will enable others skilled in the art to which it appertains to make and use the same.

My invention has relation to a heating appliance designed to hold a curling-iron until uniformly heated to the desired degree.

The object of my invention is to provide a reliable means for the purpose specified which will protect the curling-iron from becoming soiled, as by soot, ashes, &c.

It will be seen from the following specification and the accompanying drawings that I have provided an appliance which while especially applicable to an ordinary stove may be applied to the top of a lamp-chimney or upon any heating-surface suitable for the purpose.

Referring to the drawings, Figure 1 is a perspective view of my invention formed integral with or attached to a stove-lid of regulation or average diameter, showing the curling-iron in position. Fig. 2 shows a modified construction for the outer part of the lid, rendering the same applicable to the varying diameters of the lid-holes of the different stoves. Fig. 3 is a central section of Fig. 1.

Reference to the various parts of my improved heating appliance will be had by figures, the same figure referring to the same part throughout.

To render my invention especially applicable for stoves, I provide the lid-section or body 1, designed to take the place of one of the lids of a stove, while centrally disposed thereon and preferably integrally formed therewith I form the truncated cone 2, having the centrally-disposed and downwardly-reaching curling-iron receptacle or tubular section 3. (Clearly shown in Fig. 3.) The lid-section 1 is provided in the usual manner with the recess 4, designed to coöperate with the usual "lifter" or stove-hook. In order to render the lid 1 capable of being received by lid-holes of varying diameters, I provide upon the outer rim thereof the graduated upwardly-inclined annular wall 5, substantially as shown in Fig. 2, and it will be readily appreciated that the lid thus formed may be received by varying-sized holes.

It will be understood that while my improved heating appliance may be cast or formed in one piece of suitable material, yet the various parts thereof may be separately formed and assembled in their respective positions.

By the construction which I have described and illustrated it will be seen that the tubular section or curling-iron receptacle 3 is entirely surrounded by an annular chamber designed to confine the heat around said tube, thus insuring that the hottest air will be retained therein. An important result is obtained by this arrangement, since the heated air or products of combustion cannot escape upward and come in contact with the handle of the curling-iron to discolor it and leave it possessed of a disagreeable odor, it being entirely unnecessary to provide vent-holes in the top of the sections 2, since the draft is otherwise provided for.

It is thought that the use of my invention will be made clearly apparent from the foregoing description, as all that is necessary is to place the device upon a stove in substitution for one of the lids thereof or upon the top of a lamp-chimney or other source of heat when the curling-iron is inserted in the tubular section 3 and left in that position until the desired temperature is reached, when said iron may be readily withdrawn in a cleanly condition ready for use.

Believing that the advantages and construction of my invention are clearly set forth, further description is dispensed with, and,

Having thus described my invention, what I claim as new, and desire to secure by Letters Patent, is—

A heater for curling-irons, consisting of a lid or body section, a vertical, hollow, conical extension of said lid terminating in a closed top, said top having a depending tube open at the top and closed at the bottom, the lid being adapted to fit the aperture of a range or stove, substantially as described and for the purpose set forth.

In testimony whereof I affix my signature in presence of two witnesses.

VICTOR E. BERNSON.

Witnesses:
VICTOR E. RYDGREN,
FRITZ R. RYDGREN.